US011199141B2

United States Patent
Yamamura et al.

(10) Patent No.: US 11,199,141 B2
(45) Date of Patent: Dec. 14, 2021

(54) GENERATOR DRIVEN BY ENGINE

(71) Applicant: HONDA MOTOR CO., LTD., Tokyo (JP)

(72) Inventors: Yoichi Yamamura, Wako (JP); Kyosuke Taniguchi, Wako (JP); Wataru Fukumoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/884,267

(22) Filed: May 27, 2020

(65) Prior Publication Data
US 2020/0284211 A1 Sep. 10, 2020

Related U.S. Application Data

(63) Continuation of application No. PCT/JP2018/029158, filed on Aug. 3, 2018.

(30) Foreign Application Priority Data

Nov. 29, 2017 (JP) .............................. JP2017-229336

(51) Int. Cl.
*F02D 29/06* (2006.01)
*F02D 41/00* (2006.01)
(Continued)

(52) U.S. Cl.
CPC ......... *F02D 29/06* (2013.01); *F02D 41/0002* (2013.01); *F02D 41/0052* (2013.01); *F02D 41/0205* (2013.01); *F02D 41/221* (2013.01)

(58) Field of Classification Search
CPC ...... F02D 29/06; F02D 41/0002; F02D 41/05; F02D 41/0205; F02D 41/221;
(Continued)

(56) References Cited

U.S. PATENT DOCUMENTS 5,218,945 A * 6/1993 Kapellen ............... F02D 31/007
123/352
6,408,625 B1 * 6/2002 Woon ..................... F02D 29/06
290/40 B
(Continued)

FOREIGN PATENT DOCUMENTS

JP    60-074998 A    4/1985
JP    60-162025 A    8/1985
(Continued)

OTHER PUBLICATIONS

Office Action dated Aug. 11, 2020, issued in counterpart JP Application No. 2017-229336, with English translation (6 pages).
(Continued)

*Primary Examiner* — Thai Ba Trieu
(74) *Attorney, Agent, or Firm* — Westerman, Hattori, Daniels & Adrian, LLP

(57) ABSTRACT

When an acceptance unit accepts an advance notice, a control unit, controls inflow amount of the air, an air fuel ratio derived from an injection amount of a fuel, and an advance of an ignition timing of an ignition device to temporarily increase a power that can be supplied by a generator. The control unit is determines whether a margin of an opening of a throttle is not less than a predetermined threshold. If the margin of the opening of the throttle is less than the predetermined threshold, the control unit inhibits a temporarily increase of the power. If the margin of the opening of the throttle is not less than the predetermined threshold, the control unit permits the temporarily increase of the power.

9 Claims, 5 Drawing Sheets

(51) Int. Cl.
*F02D 41/02* (2006.01)
*F02D 41/22* (2006.01)

(58) Field of Classification Search
CPC ...... B60W 20/10; B60W 10/02; B60W 10/06; B60W 10/08; B60K 6/485; B60K 6/488; B60K 6/442
USPC ...... 123/704, 339.18; 290/40 R, 40 B, 40 C; 180/65.2, 65.23, 65.265; 701/22
See application file for complete search history.

(56) References Cited

U.S. PATENT DOCUMENTS

| | | | | |
|---|---|---|---|---|
| 6,819,007 | B2 * | 11/2004 | Fukaya | H02P 9/305 290/40 C |
| 6,843,753 | B2 * | 1/2005 | Kishibata | F02D 41/0215 477/39 |
| 6,943,531 | B2 * | 9/2005 | Fukaya | F02D 29/06 322/10 |
| 7,023,102 | B2 * | 4/2006 | Itoh | B60W 10/26 290/40 C |
| 7,259,664 | B1 * | 8/2007 | Cho | B60L 50/61 701/22 |
| 7,372,677 | B2 * | 5/2008 | Kishibata | H02J 7/1438 361/42 |
| 7,373,919 | B2 * | 5/2008 | Asada | H02P 9/30 123/339.18 |
| 7,497,285 | B1 * | 3/2009 | Radev | B60W 10/06 180/65.225 |
| 8,525,492 | B2 * | 9/2013 | Peterson | B60L 58/30 322/44 |
| 9,561,789 | B2 * | 2/2017 | Nishi | B60K 6/485 |
| 2003/0144773 | A1 * | 7/2003 | Sumitomo | B60K 6/442 701/22 |
| 2014/0358340 | A1 * | 12/2014 | Radev | B60K 6/442 701/22 |
| 2020/0287489 | A1 * | 9/2020 | Yamamura | F02D 29/06 |
| 2020/0317183 | A1 * | 10/2020 | Rollinger | F02M 26/47 |
| 2020/0318537 | A1 * | 10/2020 | Salter | F02D 29/06 |

FOREIGN PATENT DOCUMENTS

| | | |
|---|---|---|
| JP | 6-213122 A | 8/1994 |
| JP | 2009-219315 A | 9/2009 |
| JP | 201048154 A | 3/2010 |
| JP | 2010-246297 A | 10/2010 |
| JP | 2013-106447 A | 5/2013 |

OTHER PUBLICATIONS

International Search Report dated Oct. 9, 2018, issued in counterpart International Application No. PCT/JP2018/029158 (2 pages).

* cited by examiner

GENERATOR DRIVEN BY ENGINE

CROSS-REFERENCE TO RELATED APPLICATION(S)

This application is a continuation of International Patent Application No. PCT/JP2018/029158 filed on Aug. 3, 2018, which claims priority to and the benefit of Japanese Patent Application No. 2017-229336 filed on Nov. 29, 2017, the entire disclosures of which are incorporated herein by reference.

BACKGROUND OF THE INVENTION

Field of the Invention

The present invention relates to an engine generator comprising a generator driven by an engine.

Description of the Related Art

A portable generator including an internal combustion engine is used to supply power to an electric device at a construction site, an outdoor leisure, or a stall. PTL 1 proposes driving an engine at a rotation speed corresponding to the magnitude of a load at the time of activating the load.

PTL 1: Japanese Patent Laid-Open No. 2013-106447

SUMMARY OF INVENTION

The portable generator is sometimes used to supply power to an air conditioner mounted on an RV (recreational vehicle). Such an air conditioner includes a motor (induction motor) and a compressor. When activating the air conditioner, the motor needs starting power more than a rated value. Hence, even if a user prepares a generator of a power generation capacity corresponding to the rated value of the motor, the air conditioner cannot be activated. By the method of PTL 1, the rotation speed of the engine cannot immediately rise to the rotation speed corresponding to the starting power of the air conditioner, and after all, the engine stalls. Hence, the user needs to purchase a generator of a larger power generation capacity again, and the usability is poor. It is therefore an object of the present invention to provide an engine generator capable of supplying power, without stall, to a load that needs relatively large power at the time of activation.

According to the present invention, for example, there is provided an engine generator comprising: an engine: a throttle configured to adjust an inflow amount of air to be supplied to the engine; an injection device configured to inject fuel to the engine; an ignition device configured to ignite a gas mixture of the fuel and the air in the engine; a generator driven by the engine to generate power; a supply unit configured to supply the power generated by the generator to an external load; an acceptance unit configured to accept an advance notice representing that the power is supplied from the supply unmit to the external load; and a control unit configured to, when the acceptance unit accepts the advance notice, control the inflow amount of the air, an air fuel ratio derived from an injection amount of the fuel, and an advance of an ignition timing of the ignition device to temporarily increase the power that can be supplied by the generator, wherein the control unit is configured to determine whether a margin of an opening of the throttle is not less than a predetermined threshold, wherein if the margin of the opening of the throttle is less than the predetermined threshold, the control unit inhibits a temporarily increase of the power, and if the margin of the opening of the throttle is not less than the predetermined threshold, the control unit permits the temporarily increase of the power.

According to the present invention, there is provided an engine generator capable of supplying power, without stall, to a load that needs relatively large power at the time of activation.

Other features and advantages of the present invention will be apparent from the following descriptions taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

First Embodiment

Figure 1:
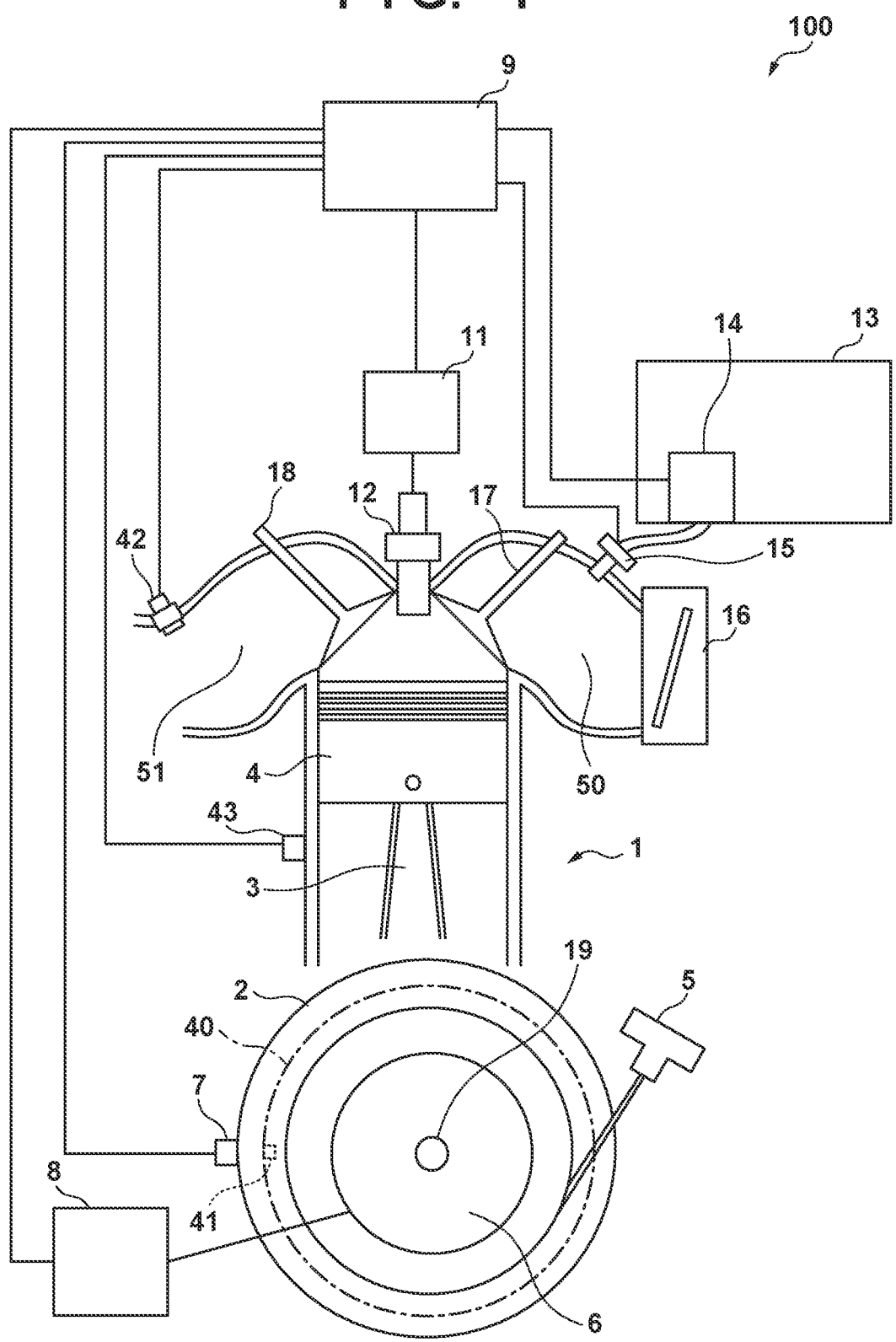
FIG. 1 is a schematic view showing an engine system.

<Engine System>
FIG. 1 is a schematic view showing an engine system 100. The engine system 100 may be called an electronically controlled fuel injection control system. An internal combustion engine 1 is a 4-stroke engine. A crankshaft 19 is stored in a crankcase 2. When the crankshaft 19 rotates, a piston 4 connected to a connecting rod 3 moves in the vertical direction in a cylinder. A recoil starter 5 used to start the internal combustion engine 1 is connected to the crankshaft 19. A recoil operator grasps and pulls the handle of the recoil starter 5, thereby rotating the crankshaft 19. A generator 6 is connected to the crankshaft 19. When the crankshaft 19 rotates, the rotor of the generator 6 rotates and generates power. The crank angle of the crankshaft 19 is detected by a crank angle sensor 7. The crank angle sensor 7 may be, for example, a Hall element configured to detect the magnetism of a magnet 41 provided on a flywheel 40 connected to the crankshaft 19. The detection result of the crank angle sensor 7 may be used to calculate the engine speed. A power supply circuit 8 includes an inverter that converts an AC generated by the generator 6 into an AC of a predetermined frequency, a circuit that converts the AC into a DC, a circuit that converts the level of the DC voltage, and the like. The power supply circuit 8 supplies the power generated by the generator 6 to a control unit 9. Note that when the crankshaft 19 is rotated by the recoil starter 5, the generator 6 generates sufficient power for the control unit 9 to operate. The control unit 9 is an engine control unit (ECU) and controls the power supplied from the power supply circuit 8 to an ignition device 11, a fuel pump 14, an injector 15, a throttle motor 16, and the like. The ignition device 11 supplies ignition power to cause a spark plug 12 to cause spark discharge. A fuel tank 13 is a container that stores fuel. The fuel pump 14 is a pump that supplies fuel stored in the fuel tank 13 to the injector 15. Referring to FIG. 1, the fuel pump 14 is provided in the fuel tank. The throttle motor 16 is a motor configured to control the inflow amount of air flowing into the cylinder via an intake path 50. An intake valve 17 is a valve to be opened/closed by a cam configured to convert the rotary motion of the crankshaft 19 into a vertical motion, and the like. The intake valve 17 is opened in an intake stroke and is basically closed in a compression stroke, an expansion stroke, and an exhaust stroke. An exhaust valve 18 is a valve to be opened/closed by a cam configured to convert the rotary motion of the crankshaft 19 into a vertical motion, and the like. The exhaust valve 18 is opened in the exhaust stroke and is basically closed in the compression stroke, the expansion stroke, and the intake stroke. For smooth transition from exhaust to intake, a period in which the intake valve 17 and the exhaust valve 18 are simultaneously opened may be provided (overlap). An 02 sensor 42 is a sensor that detects an oxygen concentration in an exhaust gas discharged from the cylinder to an exhaust path 51. A temperature sensor 43 is a sensor that detects the temperature of the internal combustion engine 1.

<Control Unit and Power Supply Circuit>

Figure 2:
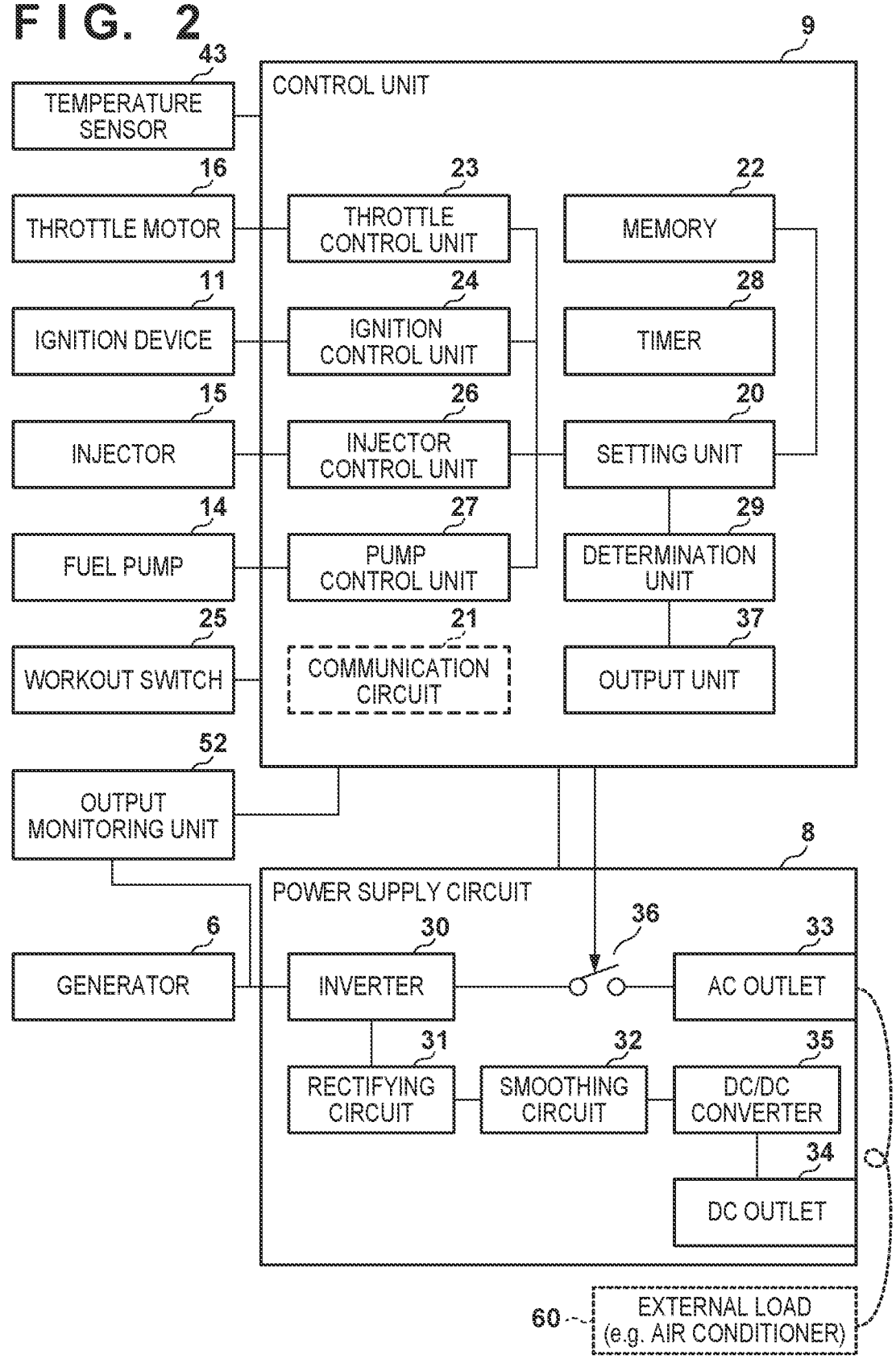
FIG. 2 is a block diagram showing a control unit and a power supply circuit.

FIG. 2 shows the function of the control unit 9 and the function of the power supply circuit 8. The function of the control unit 9 may be implemented by hardware such as an ASIC or FPGA, or may be implemented by executing a control program stored in a memory by a CPU. ASIC is an abbreviation for an application specific integrated circuit. FPGA is an abbreviation for a field programmable gate array. CPU is an abbreviation for a central processing unit. The control unit 9 may be call as a controller, a control circuit or a processor.

A setting unit 20 is a unit that sets the control parameters of the internal combustion engine 1. The setting unit 20 controls the throttle motor 16 via a throttle control unit 23 to adjust the inflow amount of air. The engine speed is thus controlled. The setting unit 20 controls the ignition device 11 via an ignition control unit 24. The ignition control unit 24 adjusts the advance of the ignition timing based on the detection result of the crank angle sensor 7. The setting unit 20 may decide a target air fuel ratio in accordance with the temperature of the internal combustion engine 1 detected by the temperature sensor 43, the load of the generator 6, ON/OFF of a workout switch 25, and the like. The setting unit 20 may convert the detection result of the 02 sensor 42 into an air fuel ratio, drive the fuel pump 14 via a pump control unit 27, and adjust the supply amount of fuel such that the air fuel ratio becomes the target air fuel ratio. The setting unit 20 may discriminate the engine stroke based on the detection result of the crank angle sensor 7, and control the injection timing of the injector 15 via an injector control unit 26 in accordance with the engine stroke. The workout switch 25 is a switch configured to give an advance notice of connection of an external load (start of supply of large power) before connection of the external load to an AC outlet 33. When the advance note is accepted by the workout switch 25, the setting unit 20 raises the rotation speed of the internal combustion engine 1 up to a workout rotation speed in advance so the internal combustion engine 1 does not stall even if the external load is connected. The workout rotation speed is higher than an upper limit value in normal driving. Hence, the generator 6 can temporarily increase the output. The setting unit 20 makes the internal combustion engine 1 transition to a workout state in accordance with a workout instruction input from the workout switch 25 or a workout instruction received from a remote controller, a smartphone, or the like via a communication circuit 21. The workout state is a state in which the internal combustion engine 1 is operating at the workout rotation speed. A timer 28 is a timer used to monitor the duration of the workout state so the duration does not exceed a limit time. This protects the internal combustion engine 1. A determination unit 29 determines whether the internal combustion engine 1 can transition to the workout state. An output unit 37 outputs a warning if the internal combustion engine 1 cannot transition to the workout state. This is because if an air conditioner or the like is connected when the internal combustion engine 1 cannot transition to the workout state, the internal combustion engine 1 stalls. Note that the output unit 37 may output a notification representing that the internal combustion engine 1 can transition to the workout state (that is, an air conditioner or the like can be connected). This allows the user to connect an external load 60 such as an air conditioner to the AC outlet 33 without worries.

In the power supply circuit 8, an inverter 30 is a conversion circuit that converts an AC generated by the generator 6 into an AC of a predetermined frequency. A rectifying circuit 31 is a circuit that rectifies the AC generated by the AC generated by the generator 6. A smoothing circuit 32 is a circuit that generates a DC by smoothing a pulsating current generated by the rectifying circuit 31. Accordingly, a DC voltage of for example, 12 V is generated. The control unit 9 may PWM-control the power supplied to the fuel pump 14 in accordance with the load of the generator 6 or the internal combustion engine 1. A DC/DC converter 35 is a circuit that converts the level of the DC voltage. For example, the DC/DC converter 35 converts the DC voltage of 12 V into a DC voltage of 5 V or 3.3 V. The DC/DC converter 35 supplies the DC voltage from a DC outlet 34 to an external load.

The inverter 30 supplies an AC voltage to an external load via the AC outlet 33. In particular, a switch 36 (option) to be turned on/off by the setting unit 20 may be provided between the inverter 30 and the AC outlet 33. The switch 36 may be a semiconductor switch, a relay circuit, or the like. When a workout instruction is accepted, the setting unit 20 may keep the switch 36 off until transition to the workout state is possible, and may turn on the switch 36 when it is possible to transition to the workout state. Stall of the internal combustion engine 1 may thus be suppressed.

An output monitoring unit 52 monitors the output of the generator 6. For example, if the AC outlet 33 includes a plurality of outlet receptacles, power can be supplied to a plurality of external loads. Hence, when an air conditioner is to be connected to an outlet receptacle, it can be considered that another external load is already connected to another outlet receptacle. Hence, if the sum of the starting power of the air conditioner and the power supplied to the other external load exceeds workout power, the generator 6 cannot supply the starting power to the air conditioner. Hence, the determination unit 29 may determine, based on the monitoring result of the output monitoring unit 52, whether transition to the workout state is possible (whether it is possible to supply starting power to the air conditioner). It is assumed here that the generation capability of the generator 6 and the starting power of the air conditioner in the workout state almost match.

<Flowchart>

Figure 3:
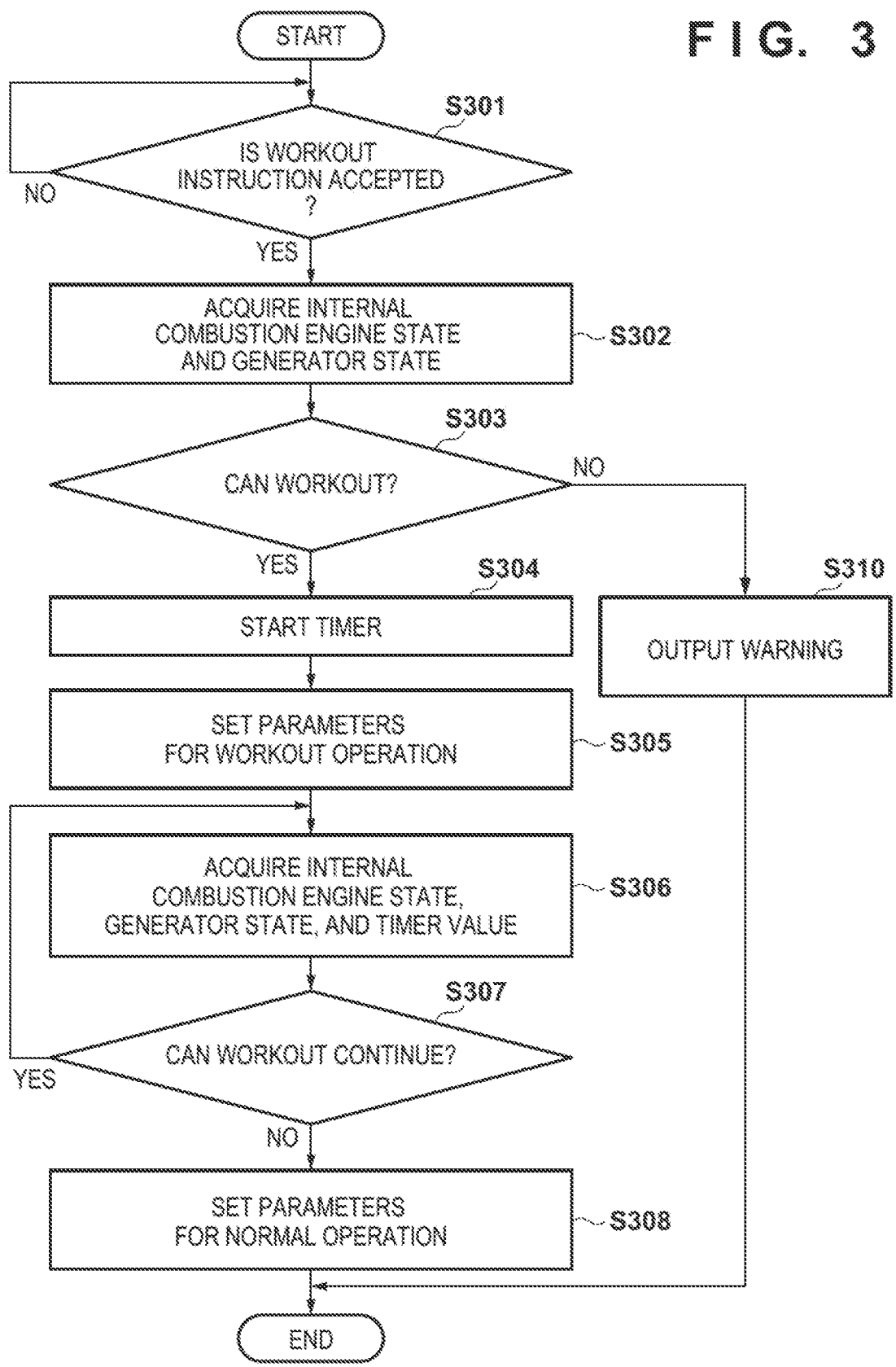
FIG. 3 is a flowchart for explaining a workout operation.

FIG. 3 is a flowchart for explaining a workout operation.

In step S301, the setting unit 20 determines whether a workout instruction is accepted. When a workout instruction is accepted via the workout switch 25 or the communication circuit 21, the setting unit 20 advances to step S302. The workout instruction may be, for example, switching the workout switch 25 from OFF to ON.

In step S302, the determination unit 29 acquires the state of the internal combustion engine 1 and the state of the generator 6. For example, the determination unit 29 may acquire the engine temperature from the temperature sensor 43. The determination unit 29 may acquire information representing the current output of the generator 6 from the output monitoring unit 52. The determination unit 29 may acquire the opening (a throttle opening or throttle margin) of the throttle motor 16 via the throttle control unit 23.

In step S303, the determination unit 29 may determine, based on the state of the internal combustion engine 1 and the state of the generator 6, whether the internal combustion engine 1 can work out. Conditions to enable workout (workout conditions) are, for example, as follows.

The engine temperature is equal to or less than a temperature threshold.

The current output of the generator 6 is equal to or less than an output threshold.

The throttle margin is equal to or more than a threshold.

If the workout conditions are satisfied, the determination unit 29 advances to step S304. If the workout conditions are not satisfied, the determination unit 29 advances to step S310. In step S310, the determination unit 29 outputs, to the output unit 37, a warning representing that workout is impossible. For example, the output unit 37 may light a red LED representing that workout is impossible. Alternatively, the output unit 37 may include a display device that displays a message representing that workout is impossible. The output unit 37 may transmit a warning to a remote controller or a smartphone via the communication circuit 21.

In step S304, the determination unit 29 or the setting unit 20 resets the timer 28 and starts counting. The timer 28 measures the duration of the workout operation.

In step S305, the setting unit 20 reads out control parameters for the workout operation from a memory 22, and sets them in the throttle control unit 23, the ignition control unit 24, the pump control unit 27, and the like. The control parameters include, for example, a target rotation speed, an air fuel ratio, the advance of an ignition timing, and the like.

Figure 4:
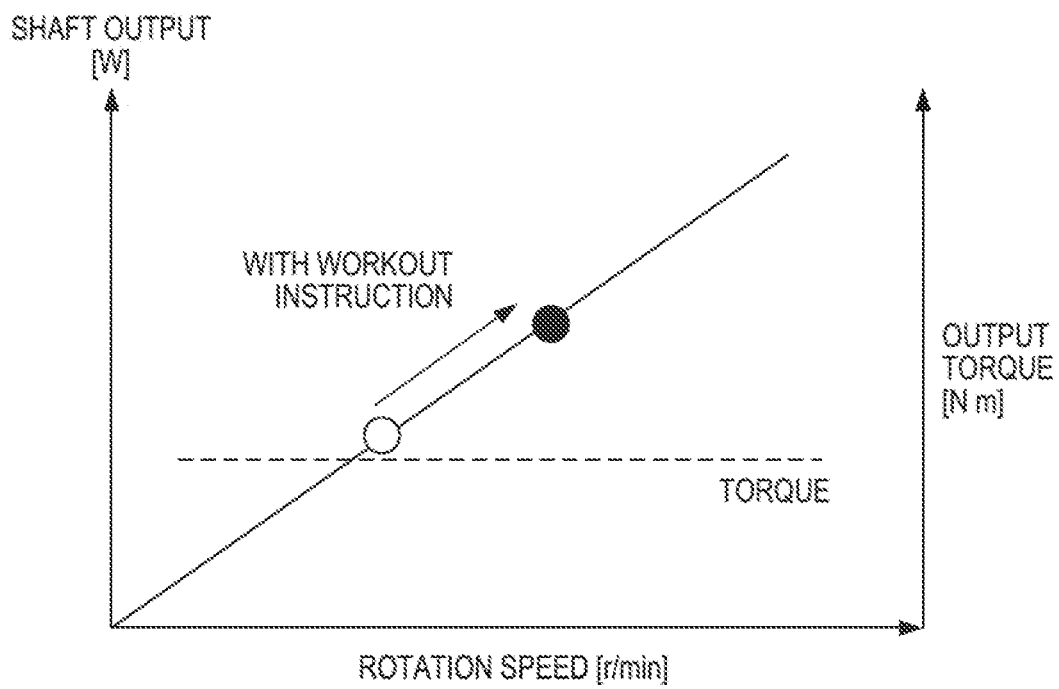
FIG. 4 is a graph showing the relationship between a rotation speed and a shaft output.

FIG. 4 shows the relationship between a rotation speed, a shaft output, and an output torque. The shaft output of the internal combustion engine 1 is the product of the torque and the rotation speed. For example, if a predetermined torque is set for the rotation speed, the shaft output increases in proportion to the rotation speed. That is, the output of the generator 6 also increases in proportion to the rotation speed. If power is to be abruptly supplied to an external load, the rotation speed of the internal combustion engine 1 lowers. In addition, the internal combustion engine 1 that is operating at an idle rotation speed stalls when a workout condition is connected to the generator 6. Hence, before an air conditioner is connected to the generator 6, the control unit 9 raises the rotation speed of the internal combustion engine 1 up to a workout rotation speed. When the air conditioner is connected, the rotation speed of the internal combustion engine 1 becomes lower than the workout rotation speed. However, stall can be prevented. As described above, if the rotation speed of the internal combustion engine 1 reaches the workout rotation speed, the control unit 9 may start supplying power to the external load.

Figure 5:
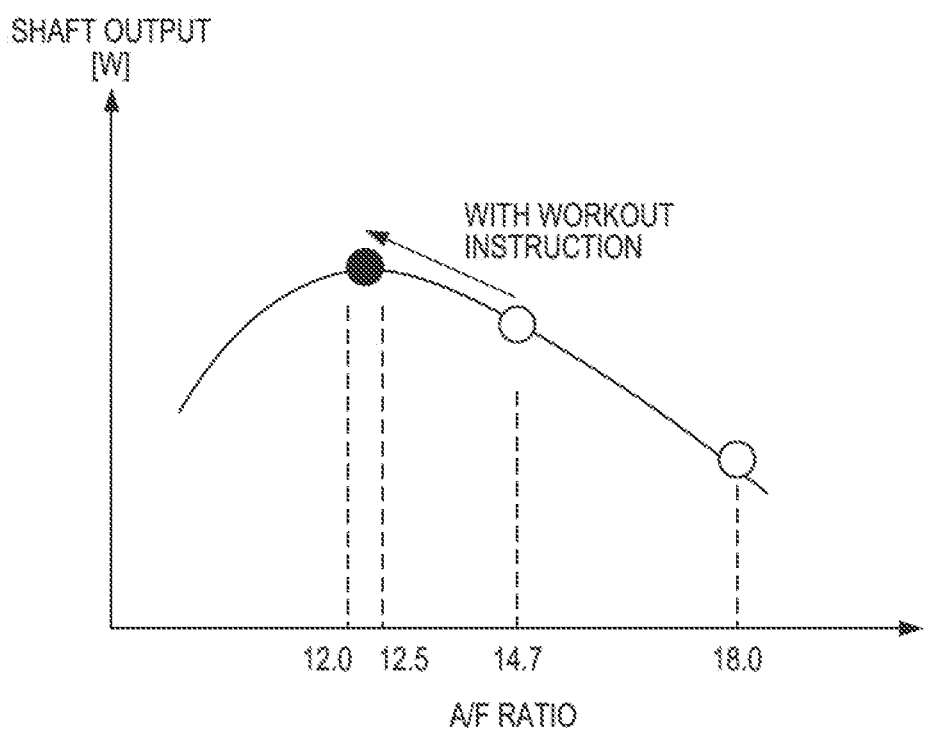
FIG. 5 is a graph showing the relationship between an A/F ratio and a shaft output.

FIG. 5 shows the relationship between an air fuel ratio (A/F ratio) and a shaft output. In general, it is known that when the A/F ratio is 12.0 to 12.5, the shaft output of a gasoline engine is maximized. On the other hand, when hydrocarbon contained in gasoline and oxygen contained in air are made to react, $H_2O$ and $CO_2$ are generated. It is also known here that the A/F ratio (stoichiometric ratio) at which neither of air and oxygen becomes excess is 14.7. If focus is placed on exhaust gas emission, the A/F ratio is generally set to 14.7 (stoichiometric control). If focus is placed on suppression of fuel consumption, the A/F ratio is increased up to about 18 (lean burn control). In this case, since the shaft output considerably lowers, the load driving capability of the generator 6 also lowers. However, this state suffices for the generator 6 to drive a light load. When a workout instruction is input, the control unit 9 stops stoichiometric control or lean burn control, and sets the A/F ratio to a value from 12.0 (inclusive) to 12.5 (inclusive). As shown in FIG. 5, within the A/F ratio range from 12.0 (inclusive) to 12.5 (inclusive), the shaft output is expected to be maximized.

Figure 6:
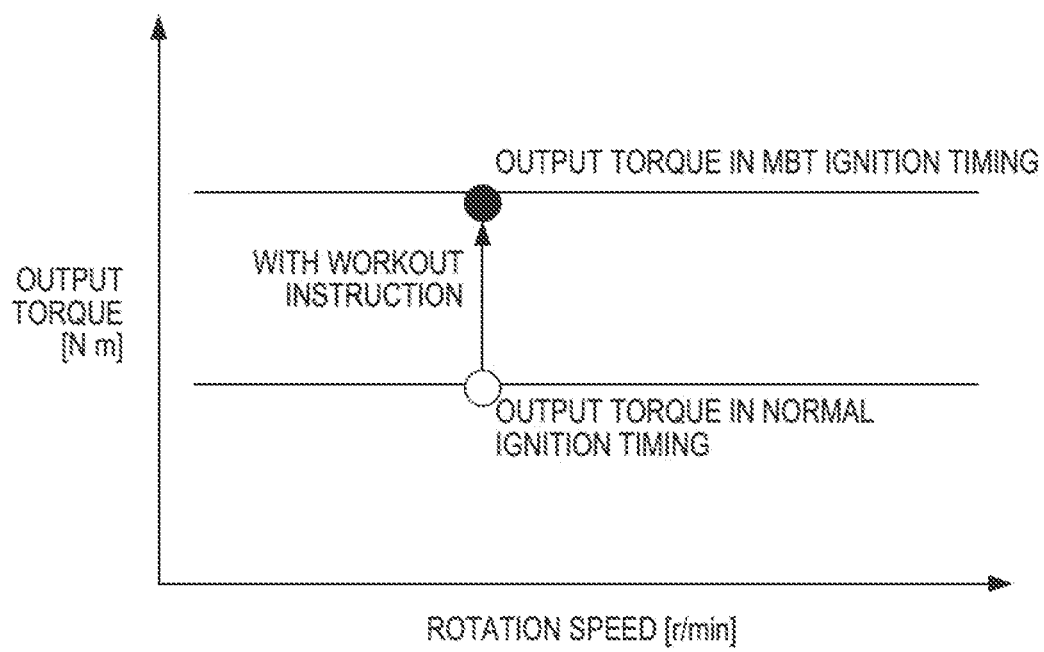
FIG. 6 is a graph showing the relationship between a rotation speed and an output torque.

FIG. 6 shows the relationship between a rotation speed and an output torque. The ignition timing in which the maximum output torque can be expected is called an MBT (Minimum-advanced for Best Torque). However since priority is given to stabilization of the rotation of the internal combustion engine 1, the ignition timing is not set to the MBT in most cases. Hence, when a workout instruction is input, the setting unit 20 sets the ignition timing to the MBT. Accordingly, the output expected value is maximized.

In step S306, the determination unit 29 acquires the state of the internal combustion engine 1, the state of the generator 6, and the count value (timer value) of the timer 28.

In step S307, the determination unit 29 determines whether the internal combustion engine 1 can continue the workout operation. Conditions to enable continuation of the workout operation (continuation conditions) are, for example, as follows.

The engine temperature is equal to or less than a temperature threshold.

The current output of the generator 6 is equal to or less than the maximum output value.

The throttle margin is equal to or more than a threshold.

The workout duration measured by the timer 28 is equal to or less than a limit time.

Upon determining that the internal combustion engine 1 can continue workout, the determination unit 29 returns to step S306. On the other hand, upon determining that the internal combustion engine 1 cannot continue the workout operation, the determination unit 29 advances to step S308.

In step S308, the setting unit 20 reads out control parameters for a normal operation from the memory 22, and sets them in the throttle control unit 23, the ignition control unit 24, the pump control unit 27, and the like. The control parameters include, for example, a target rotation speed, an air fuel ratio, the advance of an ignition timing, and the like.

<Summary>

According to the present invention, the engine system 100 is an example of an engine generator. The throttle motor 16 is an example of a throttle configured to adjust the inflow amount of air to be supplied to the internal combustion engine 1. The fuel pump 14 and the injector 15 are an example of an injection device configured to inject or supply fuel to the internal combustion engine 1. The ignition device 11 is an example of an ignition device configured to ignite a gas mixture of the fuel and the air in the internal combustion engine 1. The generator 6 is an example of a generator driven by the internal combustion engine 1 to generate power. The AC outlet 33 is an example of a supply unit configured to supply the power generated by the generator 6 to an external load (RV air conditioner or the like). The workout switch 25 or the communication circuit 21 is an example of an acceptance unit configured to accept an advance notice representing that the power is supplied from the supply unit to the external load. As described above, the advance notice suggests the start of supply of large power. When the acceptance unit accepts the advance notice, the control unit 9 controls the inflow amount of air, the air fuel ratio derived from the injection amount of fuel, and the advance of the ignition timing of the ignition device to temporarily increase the power that can be supplied by the generator 6. This provides an engine generator that hardly stalls while supplying power to a load that needs relatively large power at the time of activation.

As shown in FIG. 2, the timer 28 is an example of a timer configured to start counting time when the advance notice is accepted. When the advance notice is accepted, the control unit 9 increases the inflow amount of the air, enriches the air fuel ratio derived from the injection amount of the fuel, and increases the advance of the ignition timing of the ignition device to increase the power that can be supplied by the generator 6. When the time counted by the timer 28 becomes not less than a predetermined time, the control unit 9 returns the inflow amount of the air, the air fuel ratio derived from the injection amount of the fuel, and the advance of the ignition timing of the ignition device to original values (e.g., parameters for a normal operation). An external load using an induction motor, such as an air conditioner, needs large power at the time of activation. However, the time in which the large power is necessary is not so long. Hence, fuel consumption can be reduced by limiting the time for operating the internal combustion engine 1 at the workout rotation speed. In addition, a mechanical burden on the internal combustion engine 1 is also reduced.

The determination unit 29 is an example of an output determination unit for determining, when the advance notice is accepted, whether the output of the generator 6 exceeds a predetermined threshold. If the output of the generator 6 exceeds the predetermined threshold, the control unit 9 inhibits a temporarily increase of the power. On the other hand, if the output of the generator 6 does not exceed the predetermined threshold, the control unit 9 permits the temporarily increase of the power. This suppresses stall of the internal combustion engine 1. It is also considered that the generator 6 already supplies power to another external load before an external load such as an air conditioner is connected. In this case, it may be impossible to supply sufficient activation power to an external load such as an air conditioner. Hence, the temporarily increase of the power is inhibited or permitted in accordance with the current output of the generator 6, thereby suppressing stall of the internal combustion engine 1.

The temperature sensor 43 is an example of a temperature sensor configured to detect the temperature of the internal combustion engine 1. The determination unit 29 is an example of a temperature determination unit for determining, when the advance notice is accepted, whether the temperature of the internal combustion engine 1 is a temperature at which a temporarily increase of the power can be permitted. If the temperature of the internal combustion engine 1 is not the temperature at which the temporarily increase of the power can be permitted, the control unit 9 inhibits the temporarily increase of the power. If the temperature of the internal combustion engine 1 is the temperature at which the temporarily increase of the power can be permitted, the control unit 9 permits the temporarily increase of the power. This suppresses the stall of the internal combustion engine 1.

The determination unit 29 is an example of a throttle determination unit for determining whether a margin of an opening of the throttle is not less than a predetermined threshold. If the margin of the opening of the throttle is less than the predetermined threshold, the control unit 9 inhibits a temporarily increase of the power, and if the margin of the opening of the throttle is not less than the predetermined threshold, the control unit 9 permits the temporarily increase of the power. This suppresses the stall of the internal combustion engine 1 while ensuring the controllability of the throttle.

The output unit 37 is an example of an output unit for outputting a notification warning about connection of an excessive external load to the supply unit when the temporarily increase of the power should be inhibited. This prevents the user for connecting an excessive external load.

The workout switch 25 is an example of a switch configured to switch between a state in which the temporarily increase of the power is requested and a state in which the temporarily increase of the power is canceled. The communication circuit 21 is an example of a communication unit for receiving an instruction to switch between a state in which the temporarily increase of the power is requested and a state in which the temporarily increase of the power is canceled.

The control unit 9 may set the air fuel ratio to a value within a range between 12.0 (inclusive) and 12.5 (inclusive) to temporarily increase the power that can be supplied by the generator 6. This is because at the air fuel ratio of 12.0 (inclusive) to 12.5 (inclusive), the shaft output is expected to be maximized, as shown in FIG. 5.

The control unit 9 may set the ignition timing of the ignition device 11 to an MBT (Minimum-advanced for Best Torque) to temporarily increase the power that can be supplied by the generator 6. This is because with the MBT, the output torque is expected to be maximized.

The present invention is not limited to the above embodiments, and various changes and modifications can be made within the spirit and scope of the present invention. Therefore, to apprise the public of the scope of the present invention, the following claims are made.

What is claimed is:

1. An engine generator comprising:
   an engine;
   a throttle configured to adjust an inflow amount of air to be supplied to the engine;
   injector configured to inject fuel to the engine;
   an ignitor configured to ignite a gas mixture of the fuel and the air in the engine;
   a generator driven by the engine to generate power;
   an outlet configured to supply the power generated by the generator to an external load; and
   a processor configured to
      accept an advance notice representing that the power is supplied from the outlet to the external load;
      control the inflow amount of the air, an air fuel ratio derived from an injection amount of the fuel, and an advance of an ignition timing of the ignitor to temporarily increase the power to be supplied by the generator when the processor accepts the advance notice;
      determine whether a margin of an opening of the throttle is not less than a predetermined threshold;
   wherein
      if the margin of the opening of the throttle is less than the predetermined threshold, the processor inhibits a temporary increase of the power; and if the margin of the opening of the throttle is not less than the predetermined threshold, the processor permits the temporary increase of the power.

2. The engine generator according to claim 1, further comprising:
a timer configured to start counting time when the advance notice is accepted;
wherein
when the advance notice is accepted, the processor increases the inflow amount of the air, enriches the air fuel ratio derived from the injection amount of the fuel, and increases the advance of the ignition timing of the ignitor to increase the power to be supplied by the generator; and
when the time counted by the timer becomes not less than a predetermined time, the processor returns the inflow amount of the air, the air fuel ratio derived from the injection amount of the fuel, and the advance of the ignition timing of the ignitor to original values.

3. The engine generator according to claim 1,
wherein the processor is further configured to determine, when the advance notice is accepted, whether an output of the generator exceeds a predetermined threshold; and
wherein
if the output of the generator exceeds the predetermined threshold, the processor inhibits a temporary increase of the power; and
if the output of the generator does not exceed the predetermined threshold, the processor permits the temporary increase of the power.

4. The engine generator according to claim 3, further comprising an output unit configured to output a notification warning about connection of an excessive external load to the outlet when the temporary increase of the power should be inhibited.

5. The engine generator according to claim 1, further comprising:
a temperature sensor configured to detect a temperature of the engine;
wherein the processor is further configured to determine, when the advance notice is accepted, whether the temperature of the engine is less than or equal to a predetermined temperature;
wherein
if the temperature of the engine is not less than or equal to the predetermined temperature, the processor inhibits the temporary increase of the power; and
if the temperature of the engine is less than or equal to the predetermined temperature, the processor permits the temporary increase of the power.

6. The engine generator according to claim 1, wherein the processor is configured to accept the advance notice through a switch configured to switch between a state in which the temporary increase of the power is requested and a state in which the temporary increase of the power is canceled.

7. The engine generator according to claim 1, wherein the processor is configured to accept the advance notice through a communication unit configured to receives an instruction to switch between a state in which the temporary increase of the power is requested and a state in which the temporary increase of the power is canceled.

8. The engine generator according to claim 1, wherein the processor sets an air fuel ratio value, being greater than or equal to 12.0 and less than or equal to 12.5 to a value temporarily increasing the power to supplied by the generator.

9. The engine generator according to claim 1, wherein the processor sets the ignition timing of the ignitor having a value of minimum-advanced value for best torque (MBT) to a value temporarily increasing the power to be supplied by the generator.

* * * * *